US011854208B2

(12) United States Patent
Terzopoulos et al.

(10) Patent No.: US 11,854,208 B2
(45) Date of Patent: Dec. 26, 2023

(54) SYSTEMS AND METHODS FOR TRAINABLE DEEP ACTIVE CONTOURS FOR IMAGE SEGMENTATION

(71) Applicant: The Regents of the University of California, Oakland, CA (US)

(72) Inventors: Demetri Terzopoulos, Los Angeles, CA (US); Ali Hatamizadeh, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 295 days.

(21) Appl. No.: 17/149,432

(22) Filed: Jan. 14, 2021

(65) Prior Publication Data

US 2021/0217178 A1   Jul. 15, 2021

Related U.S. Application Data

(60) Provisional application No. 62/961,579, filed on Jan. 15, 2020.

(51) Int. Cl.
| | | |
|---|---|---|
| *G06T 7/149* | (2017.01) | |
| *G06T 7/11* | (2017.01) | |
| *G06N 3/04* | (2023.01) | |
| *G06N 3/08* | (2023.01) | |

(52) U.S. Cl.
CPC ............... *G06T 7/149* (2017.01); *G06N 3/04* (2013.01); *G06N 3/08* (2013.01); *G06T 7/11* (2017.01); *G06T 2207/20081* (2013.01); *G06T 2207/20084* (2013.01); *G06T 2207/20116* (2013.01)

(58) Field of Classification Search
CPC . G06T 7/149; G06T 7/11; G06T 2207/20081; G06T 2207/20084; G06T 2207/20116; G06N 3/04; G06N 3/08
See application file for complete search history.

(56) References Cited

U.S. PATENT DOCUMENTS

| | | | | |
|---|---|---|---|---|
| 9,799,098 | B2 * | 10/2017 | Seung | G06V 10/454 |
| 10,032,281 | B1 * | 7/2018 | Ghesu | G16H 50/70 |
| 10,699,414 | B2 * | 6/2020 | Veni | G06T 7/149 |
| 11,127,139 | B2 * | 9/2021 | Zhang | G06N 3/045 |
| 11,151,725 | B2 * | 10/2021 | Li | G06V 10/82 |
| 11,379,985 | B2 * | 7/2022 | Wang | G06N 3/08 |

(Continued)

OTHER PUBLICATIONS

Audbert et al., "Semantic segmentation of earth observation data using multi-modal and multi-scale deep networks," in Asian Conference on Computer Vision, Nov. 2016, pp. 180-196, arXiv:1609.06846.

(Continued)

*Primary Examiner* — Gregory M Desire
(74) *Attorney, Agent, or Firm* — KPPB LLP

(57) ABSTRACT

Systems and methods for image segmentation using neural networks and active contour methods in accordance with embodiments of the invention are illustrated. One embodiment includes a method for generating image segmentations from an input image. The method includes steps for receiving an input image, identifying a set of one or more parameter maps from the input image, identifying an initialization map from the input image, and generating an image segmentation based on the set of parameter maps and the initialization map.

18 Claims, 11 Drawing Sheets

(56) References Cited

U.S. PATENT DOCUMENTS

| | | | |
|---|---|---|---|
| 2019/0114774 A1* | 4/2019 | Zhang | G06N 3/04 |
| 2021/0217178 A1* | 7/2021 | Terzopoulos | G06T 7/11 |

OTHER PUBLICATIONS

Badrinarayanan et al., "Segnet: a deep convolutional encoder-decoder architecture for image segmentation," IEEE Transactions on pattern analysis and Machine Intelligence, 2017, vol. 39, No. 12, pp. 2481-2495, arXiv:1511.00561.

Bischke et al., "Multi-task learning for segmentation of building footprints with deep neural networks," in 2019 IEEE International Conference on Image Processing (ICIP), 2019, pp. 1480-1484, arXiv:1709.05932, Sep. 18, 2017.

Caselles et al., "Geodesic Active Contours," International Journal of Computer Science, 1997, vol. 22, No. 1, pp. 61-79.

Chan et al., "Active Contours Without Edges," IEEE Transactions on Image Processing, Feb. 2001, vol. 10, No. 2, pp. 266-277.

Chen et al., "DeepLab: Semantic Image Segmentation with Deep Convolutional Nets, Atrous Convolution, and Fully Connected CRFs," IEEE Transactions on Pattern Analysis and Machine Intelligence, 2018, vol. 40, No. 4, pp. 834-848, arXiv:1606.00915v1], Jun. 2, 2016.

Chen et al., "Hybrid Task Cascade for Instance Segmentation," in Proceedings of the IEEE Conference on computer Vision and Pattern Recognition, 2019, pp. 4974-4983.

Chen et al., "Learning Active Contour Models for Medical Image Segmentation," in Proceedings of the IEEE Conference on Computer Vision and Pattern Recognition, 2019, pp. 11632-11640.

Cheng et al., "DARNet: Deep Active Ray Network for Building Segmentation," in Proceedings of the IEEE Conference on Computer Vision and Pattern Recognition, 2019, pp. 7431-7439.

Costea et al., "Creating Roadmaps in Aerial Images with Generative Adversarial Networks and Smoothing-based Optimization," in Proceedings of the IEEE International Conference on Computer Vision (ICCV) Workshops, Oct. 2017, pp. 2100-2109.

Gerihos et al., "Imagenet-trained CNNs are biased towards texture; increasing shape bias improves accuracy and robustness," in International Conference on Learning Representations (ICLR), 2019, 22 pgs., arXiv:1811.12231, Jan. 14, 2019.

Gur et al., "End to End Trainable Active Contours via Differentiable Rendering," In Proceedings of the International conference on Learning Representatives, (ICLR) 2019, 13 pgs.

Gur et al., "Unsupervised Microvas.cular Image Segmentation Using an Active Contours Mimicking Neural Network," in Proceedings of the IEEE International Conference on Computer Vision, 2019, pp. 10722-10731.

Hatamizadeh et al., "Deep Active Lesion Segmentation," in International Workshop on Machine Learning in Medical Learning, Springer, 2019, pp. 98-105.

Hatamizadeh et al., "Deep Dialated Convolutional Nets for the Automatic Segmentation of Reginal Vessels," 10 pgs., arXiv:1905.12120, Jul. 21, 2019.

Hatamizadeh et al., "End-to-End Boundary Aware Networks for Medical Image Segmentation," arXiv:1908.08071, Aug. 21, 2019, 8 pgs.

Hatamizadeh et al., "End-to-End Deep Convolutional Active Contours for Image Segmentation," arXiv:1909.13359, Sep. 29, 2019, 8 pgs.

He et al., "Deep residual learning for image recognition," arXiv:1512.03385 [cs.CV], in 2016 IEEE Conference on Computer Vision and Pattern Recognition, Dec. 10, 2015, pp. 1-12.

Hu et al., "Deep Level Sets for Salient Object Detection," in Proceedings of the IEEE Conference on Computer Vision and Pattern Recognition (CVPR), 2017, pp. 2300-2309.

Kass et al., "Snakes: Active contour models," International Journal of Computer Vision, 1988, vol. 1, No. 4, pp. 321-331.

Kingma et al., "Adam: A Method for Stochastic Optimization," arXiv.org, Retrieved from: https://arxiv.org/abs/1412.6980v1 [cs.LG], Dec. 22, 2014, 9 pgs.

Lankton et al., "Localizing Region-Based Active Contours," NIH Public Access Author Manuscript, published in final edited form as: IEEE Trans Image Process, Nov. 2008, vol. 17, No. 11, pp. 2029-2039; doi:10.1109/TIP.2008.2004611.

Le et al., "Reformulating Level Sets as Deep Recurrent Neural Network Approach to Semantic Segmentation," IEEE Transactions on Image Processing, May 2018, vol. 27, No. 5, pp. 2393-2407, doi: 10.1109/TIP.2018.2794205.

Li et al., "Distance Regularized Level Set Evolution and Its Application to Image Segmentation," IEEE Transaction on Image Processing, Dec. 2010, vol. 19, No. 12, pp. 3243-3254, DOI:10.1109/TIP.2010.2069690.

Marcos et al., "Learning deep structured active contours end-to-end," Proceedings of the IEEE Conference on Computer Vision and Pattern Recognition (CVPR), 2018, pp. 8877-8885.

Marquez-Neila et al., "A Morphological Approach to Curvature-Based Evolution of Curves and Surfaces," IEEE Transactions on Pattern Analysis and Machine Intelligence, Jan. 2014, vol. 36, Issue 1, pp. 2-17, published Jun. 11, 2013, DOI: 10.1109/TPAMI.2013.106.

Myronenko et al., "Robust Semantic Segmentation of Brain Tumor Regions from 3D MRIs," in International MICCAI Brainlesion Workshop, springer, 2019, pp. 82-89.

Osher et al., "Fronts Propagating with Curvature-Dependent Speed: Algorithms Based on Hamilton-Jacobi Formulations," Journal of Computational Physics, 1988, vol. 79, pp. 12-49.

Perazzi et al., "A Benchmark Dataset and Evaluation Methodology for Video Object Segmentation," Proceedings of the IEEE Conference on Computer Vision and Pattern Recognition, 2016, pp. 724-732, DOI: 10.1109/CVPR.2016.85.

Ronneberger et al., "U-net: Convolutional networks for biomedical image segmentation," International Conference on Medical image computing and computer-assisted intervention, Springer, Cham, 2015, pp. 234-241, arXiv:1505.04597 [cs.CV], May 18, 2015.

Rudner et al., "Multi3Net: Segmenting Flooded Buildings via Fusion of Multiresolution, Multisensor, and Multitemporal Satellite Imagery," Proceedings of the Thirty-Third Conference AAAI Conference on Artificial Intelligence, Jul. 23, 2019, vol. 33, No. 1, pp. 702-709.

Shrivastava et al., "Remote-sensing the urban area: Automatic building extraction based on multiresolution segmentation and classification," Malaysian Journal of Society and Space, 2017, vol. 11, No. 2, pp. 1-16.

Silberman et al., "Instance Segmentation of Indoor Scenes using a Coverage Loss," Computer Vision—ECCV-2014, pp. 616-631.

Wang et al., "Object Instance Annotation with Deep Extreme Level Set Evolution," Conference: 2019 IEEE/CVF Conference on Computer Vision and Pattern Recognition (CVPR), Jun. 2019, pp. 7500-7508, DOI: 10.1109/CVPR.2019.00768.

Wang et al., "TorontoCity: Seeing the World with a Million Eyes," arXiv:1612.00423, Dec. 1, 2016, pp. 1-9.

Wu et al., "Automatic Building Segmentation of Aerial Imagery Using Multi-Constraint Fully Convolutional Networks," Remote Sensing, Mar. 6, 2018, vol. 10, No. 3, 407, pp. 1-18, doi:10.3390/rs10030407.

Xie et al., "Mitigating adversarial effects through randomization," published as a conference paper at ICLR 2018, arXiv:1711.01991, Feb. 28, 2018, 16 pgs.

Xu et al., "Building Extraction in Very High Resolution Remote Sensing Imagery Using Deep Learning and Guided Filters," Remote Sensing, Jan. 19, 2018, vol. 10, No. 144, pp. 1-18, DOI: 10.3390/rs100010144.

Zhang et al., "Urban Land Use and Land Cover Classification Using Novel Deep Learning Models Based on High Spatial Resolution Satellite Imagery," Sensors, Nov. 1, 2018, vol. 18, No. 3717, pp. 1-21, doi: 10.3390/s18113717.

\* cited by examiner

SYSTEMS AND METHODS FOR TRAINABLE DEEP ACTIVE CONTOURS FOR IMAGE SEGMENTATION

CROSS REFERENCE TO RELATED APPLICATIONS

This application claims priority to U.S. Provisional Patent Application Ser. No. 62/961,579, filed Jan. 15, 2020, the disclosure of which is herein incorporated by reference in its entirety.

FIELD OF THE INVENTION

The present invention generally relates to image segmentation and, more specifically, image segmentation using convolutional neural networks and active contours.

BACKGROUND

Image segmentation is the division of an image into multiple segments. Images can be segmented for a variety of different purposes, such as (but not limited to) the identification of elements in an image, the separation of different regions (e.g., foreground-background), edge detection, etc. With the growth of machine vision applications, it can be increasingly desirable to automatically segment images, but automated segmentation of images can pose various problems.

SUMMARY OF THE INVENTION

Systems and methods for image segmentation in accordance with embodiments of the invention are illustrated. One embodiment includes a method for generating image segmentations from an input image. The method includes steps for receiving an input image, identifying a set of one or more parameter maps from the input image, identifying an initialization map from the input image, and generating an image segmentation based on the set of parameter maps and the initialization map.

In a further embodiment, identifying the set of parameter maps and identifying the initialization map are performed using a single convolutional neural network (CNN).

In still another embodiment, generating the image segmentation is performed using an active contour model (ACM).

In a still further embodiment, the ACM is a differentiable model.

In yet another embodiment, the ACM includes several neural network layers.

In a yet further embodiment, the set of parameter maps includes a first parameter map representing inward forces for a contour and a second parameter map representing outward forces for the contour.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
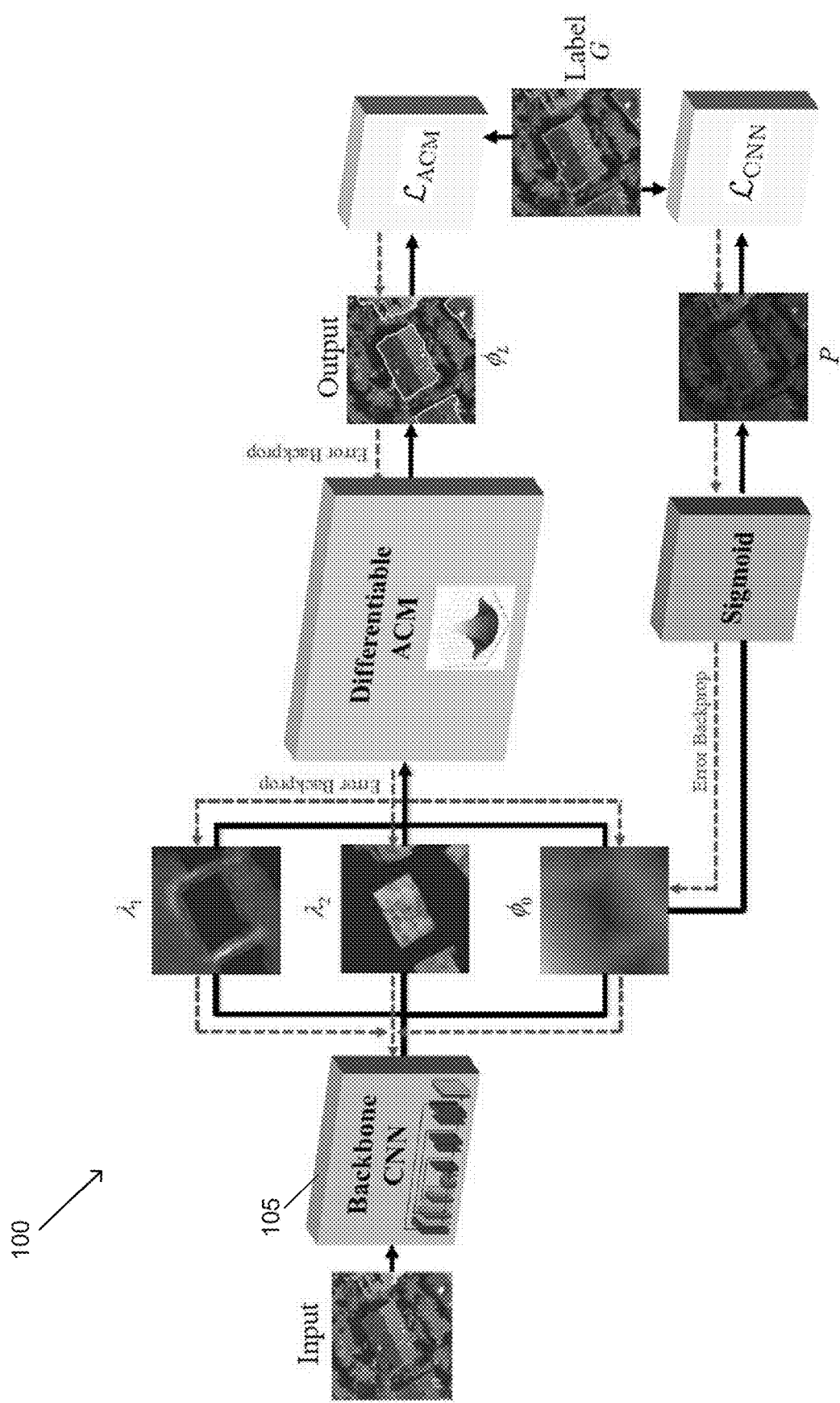
FIG. 1 illustrates an example framework in accordance with an embodiment of the invention.

The Active Contour Model (ACM) is a standard image analysis technique whose numerous variants have attracted an enormous amount of research attention across multiple fields. ACM has been successfully employed in various image analysis tasks, including object segmentation and tracking. In most ACM variants the deformable curve(s) of interest dynamically evolves through an iterative procedure that minimizes a corresponding energy functional. Since the ACM is a model-based formulation founded on geometric and physical principles, the segmentation process relies mainly on the content of the image itself, not on large annotated image datasets, extensive computational resources, and hours or days of training. However, the classic ACM relies on some degree of user interaction to specify the initial contour and tune the parameters of the energy functional, which undermines its applicability to the automated analysis of large quantities of images. Incorrectly, however, the ACM's differential-equation-based formulation and prototypical dependence on user initialization have been regarded as being largely incompatible with the recently popular deep learning approaches to image segmentation.

In recent years, Deep Neural Networks (DNNs) have become popular in many areas. In computer vision, various CNN architectures have been successfully applied to numerous applications ranging from 2D image classification and object detection on resource-constrained devices to 3D object segmentation and shape and scene synthesis on high-end GPUs. Despite their tremendous success, the performance of CNNs is still very dependent on their training datasets. In essence, CNNs rely on a filter-based learning scheme in which the weights of the network are usually tuned using a back-propagation error gradient decent approach. Since CNN architectures often include millions of trainable parameters, the training process relies on the sheer size of the dataset. In addition, CNNs usually generalize poorly to images that differ from those in the training datasets and they are vulnerable to adversarial examples. For image segmentation, capturing the details of object boundaries and delineating them remains a challenging task even for the most promising of CNN architectures that have achieved state-of-the-art performance on relevant benchmarked datasets. In the field of image segmentation with ACM, it can be technically difficult for an automated process (e.g., a computer) to initialize the ACM without user supervision or intervention.

Some others have attempted to integrate CNNs with ACMs in an end-to-end manner as opposed to utilizing the ACM merely as a post-processor of the CNN output. Some such approaches have implemented level-set ACMs as Recurrent Neural Networks (RNNs), which can be computationally inefficient when compared to CNNs. Such approaches also use constant weighted parameters, while processes in accordance with certain embodiments of the invention can employ a novel locally-penalized energy functional. In addition, other approaches require two pre-trained CNN backbones (one for object localization, the other for classification). Processes in accordance with a variety of embodiments of the invention can employ a single CNN that can be an untrained CNN that is trained from scratch along with the ACM.

Other attempts have integrated ACMs with CNNs in a structured prediction framework, but these works depend heavily on the manual initialization of contours and has a parametric formulation that can handle the identification of a single element at a time. In addition, such approaches can require the explicit calculation of gradients. On the contrary, systems and methods in accordance with many embodiments of the invention can operate without any external supervision and can leverage an Eulerian ACM which can naturally handle multiple instances (e.g., different buildings in an image) simultaneously. In addition, processes in accordance with numerous embodiments of the invention can implement an automatically differentiable ACM in order to fully automate the direct back-propagation of gradients through the entire framework.

Systems and methods in accordance with several embodiments of the invention can provide an end-to-end trainable image segmentation framework for the unification of these two paradigms. In various embodiments, frameworks can include a machine learning model (e.g., a Convolutional Neural Network (CNN)) and an ACM with learnable parameters. ACMs in accordance with a variety of embodiments of the invention can utilize a locally-penalized energy functional that is directly predicted by a backbone CNN. In several embodiments, the ACM's Eulerian energy functional can include per-pixel parameter maps (or 2D feature maps) predicted by the backbone CNN, which can be used to initialize the ACM. Frameworks in accordance with a number of embodiments of the invention can be end-to-end automatically differentiable, allowing for backpropagation without user intervention.

An example framework in accordance with an embodiment of the invention is illustrated in FIG. 1. In this example, the framework can provide for the end-to-end training of an automatically differentiable ACM and backbone CNN without user intervention. In many embodiments, CNNs can be trained to properly initialize ACMs (e.g., via a generalized distance transform or initialization map) as well as the per-pixel parameter maps in the ACM's energy functional. In the example of this figure, an input image provided to a CNN backbone 105 of a framework 100. CNN backbone 105 generates an initialization map and parameter maps ($\lambda_1$ and $\lambda_2$). In a variety of embodiments, an initialization map and parameter maps $\lambda_1$ and $\lambda_2$ can be provided to an ACM (or Differentiable Contour Propagation) to generate an image segmentation prediction. The image segmentation prediction can be compared to a ground-truth label (or segmentation) of the input image to compute a set of one or more losses. For example, a loss on the output of a CNN can be added to the set of losses via a hyperparameter in accordance with some embodiments of the invention. The computed loss can then be backpropagated through the framework to update both the ACM and the CNN backbone. This process can iterate until the system converges.

Figure 2:
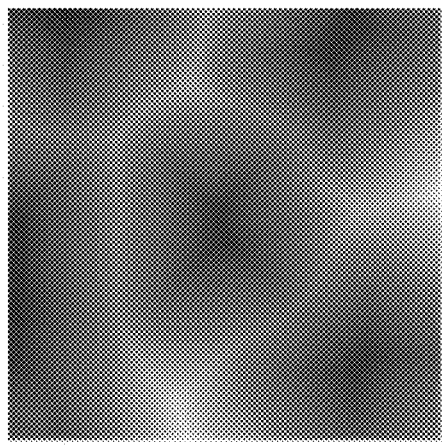
FIG. 2 illustrates examples of a learned initialization map and parameter maps for a given input image in accordance with an embodiment of the invention.
Figure 2:
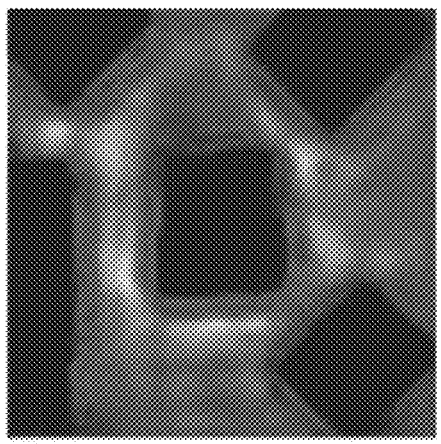
Figure 2:
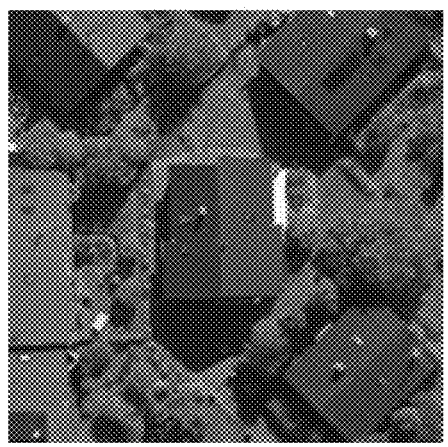
Figure 2:
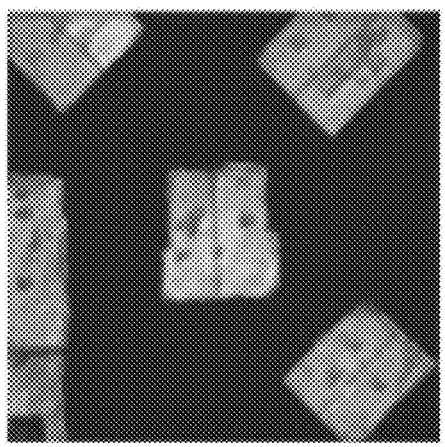

Examples of a learned initialization map and parameter maps for a given input image in accordance with an embodiment of the invention are illustrated in FIG. 2. The first image 205 shows an input image. The second image 210 shows a learned initialization map. The third and fourth images 215 and 220 illustrate parameter maps $\lambda_1(x, y)$ and $\lambda_2(x, y)$. In several embodiments, parameters $\lambda_1$ and $\lambda_2$ can represent local values for inward and outward forces for the contours.

Localized Level Set ACMs with Weighted Parameters

Figure 3:
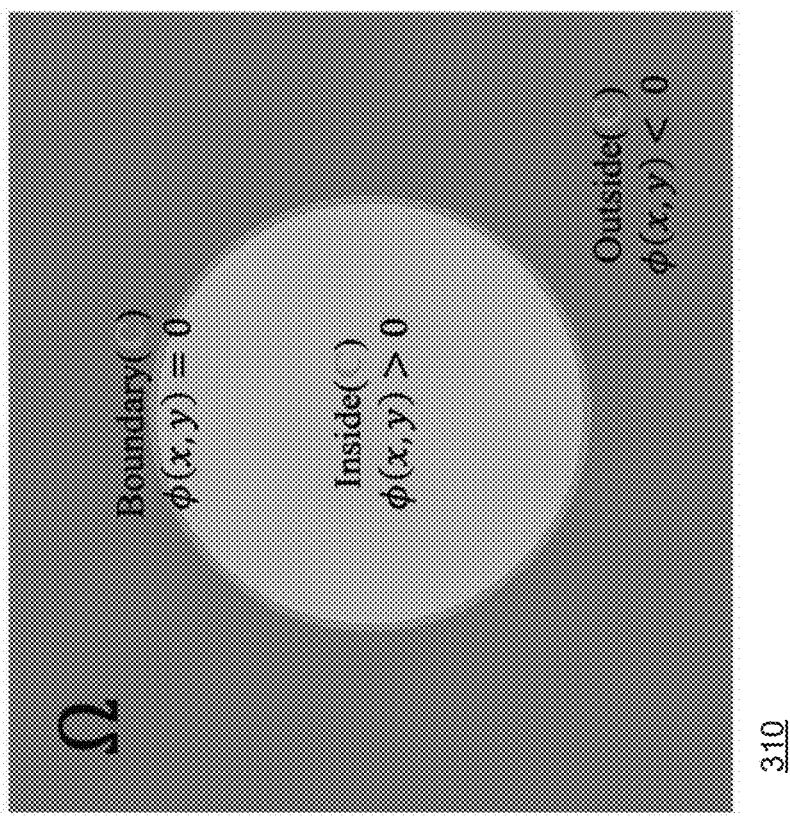
FIG. 3 illustrates an example of a boundary represented as a zero level-set of an implicit function in accordance with an embodiment of the invention.
Figure 3:
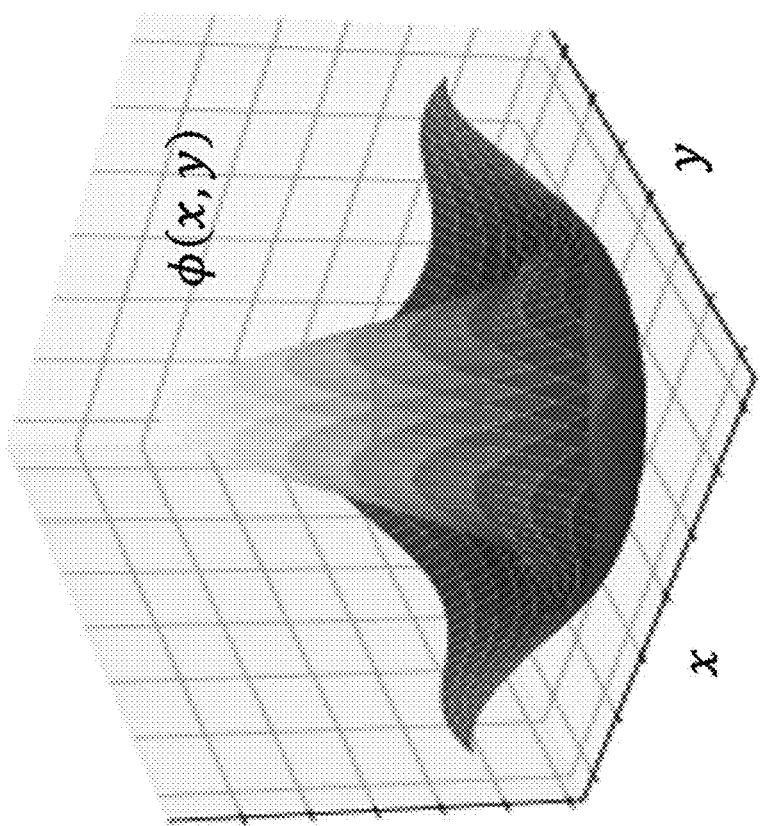

Active contour models in accordance with various embodiments of the invention can be differentiable and trainable. Instead of working with a parametric contour that encloses the desired area to be segmented, contours in accordance with numerous embodiments of the invention can be represented as the zero level-set of an implicit function. An example of a boundary represented as a zero level-set of an implicit function in accordance with an embodiment of the invention is illustrated in FIG. 3. The first section shows a 3D representation of a contour, with a zero level-set 307. The second section shows the application of the zero level-set to a 2D image, where the boundary is the zero level-set and the inside and outside are the regions of the contour that are above and below the zero level-set respectively.

"Level-set active contours" in accordance with a number of embodiments of the invention can evolve segmentation boundaries by evolving an implicit function so as to minimize an associated Eulerian energy functional. A level-set can be an implicit representation of a hypersurface that is dynamically evolved according to the nonlinear Hamilton-Jacobi equation.

Let I represent an input image and $C=\{(x, y)|\phi(x, y)=0\}$ be a closed contour in $\Omega \in \mathbb{R}^2$ represented by the zero level set of a signed distance map $\phi(x, y)$. The interior and exterior of C are represented by $\phi(x, y)>0$ and $\phi(x, y)<0$, respectively. In certain embodiments, processes can use a smoothed Heaviside function $$H(\phi(x, y)) = \frac{1}{2} + \frac{1}{\pi}\arctan\left(\frac{\phi(x, y)}{\epsilon}\right) \quad (1)$$

to represent the interior as $H(\phi)$ and exterior as $(1-H(\phi))$. The derivative of $H(\phi(x, y))$ is $$\frac{\partial H(\phi(x, y))}{\partial \phi(x, y)} = \frac{1}{\pi}\frac{\epsilon}{\epsilon^2 + \phi(x, y)^2} = \delta(\phi(x, y)). \quad (2)$$

In some embodiments, C can be evolved to minimize an energy function according to $$E(\phi) = E_{length}(\phi) + E_{image}(\phi), \quad (3)$$

where $$E_{length}(\phi) = \int_\Omega \mu \delta(\phi(x,y)) |\nabla \phi(x,y)| dxdy \quad (4)$$

penalizes the length of C whereas $$E_{image}(\phi) = \int_\Omega \delta(\phi(x,y)) [H(\phi(x,y))(I(x,y)-m_1)^2 + (1-(\phi(x,y)))(I(x,y)-m_2)^2] dxdy \quad (5)$$

can take into account the mean image intensities $m_1$ and $m_2$ of the regions interior and exterior to C. Processes in accordance with several embodiments of the invention can compute local statistics using a characteristic function $W_s$ with local window of size $f_s$, as follows:

$$W_s = \begin{cases} 1 & \text{if } x - f_s \le u \le x + f_s, \, y - f_s \le v \le y + f; \\ 0 & \text{otherwise,} \end{cases} \quad (6)$$

where x, y and u, v are the coordinates of two independent points.

Figure 4:
FIG. 4 illustrates an example of a filter that is divided by a contour into interior and exterior regions in accordance with an embodiment of the invention.

An example of a filter that is divided by a contour into interior and exterior regions in accordance with an embodiment of the invention is illustrated in FIG. 4. In this example, the point x is represented by a red dot, with six boxes on the interior of the contour of the building and three boxes to the exterior of the contour. The filter size of the convolutional operation can be an important hyper-parameter for the accurate extraction of localized image statistics. Experiments indicate that filter sizes that are too small are sub-optimal while excessively large sizes defeat the benefits of the localized formulation. Processes in accordance with a number of embodiments of the invention utilize a filter size of f between 3 and 5.

To make level-set ACMs trainable, processes in accordance with several embodiments of the invention can associate parameter maps with the foreground and background energies. These maps, $\lambda_1(x, y)$ and $\lambda_2(x, y)$, can be functions over the image domain a Therefore, an energy function may be written as $$E(\phi) = \int_\Omega \delta(\phi(x,y)) [\mu |\nabla \phi(x,y)| + \int_\Omega W_s F(\phi(u,v)) dudv] dxdy, \quad (7)$$

where $$F(\phi) = \lambda_1(x,y)(I(u,v) - m_1(x,y))^2 (H(\phi(x,y)) + \lambda_2(x,y)(I(u,v) - m_2(x,y))^2 (1-H(\phi(x,y))). \quad (8)$$

The variational derivative of E with respect to $\phi$ yields the Euler-Lagrange PDE $$\frac{\partial \phi}{\partial t} = \delta(\phi) \left[ \mu \, div \left( \frac{\nabla \phi}{|\nabla \phi|} \right) + \int_\Omega W_s \nabla_\phi F(\phi) dxdy \right] \quad (9)$$

with $$\nabla_\phi F = \delta(\phi)(\lambda_1(x,y)(I(u,v) - m_1(x,y))^2 - \lambda_2(x,y)(I(u,v) - m_2(x,y))^2). \quad (10)$$

To avoid numerical instabilities during the evolution and maintain a well-behaved $\phi(x, y)$, processes in accordance with many embodiments of the invention can add a distance regularization term to (9).

Localized formulations in accordance with a number of embodiments of the invention can enable the capture of the fine-grained details of boundaries. In a variety of embodiments, pixel-wise masks $\lambda_1(x, y)$ and $\lambda_2(x, y)$, can allow boundaries to be directly predicted by the backbone CNN along with an initialization map $\phi(x, y, 0)$. In various embodiments, implicit contour propagation can be fully automated and directly controlled by a CNN through these learnable parameter functions.

Differentiable Contour Propagation

Localized energy density in accordance with many embodiments of the invention can include a length term that depends on the gradient of the image and a region term that takes into account the difference between interior and exterior pixel intensities. To calculate the curvature in the length term, processes in accordance with some embodiments of the invention can smooth an image using a Gaussian filter and take spatial derivatives by applying two convolutional operations with corresponding Sobel filters in the x and y directions. To calculate the region term in accordance with some embodiments of the invention, the image can be probed along each point of the zero level-set contour and the mean intensity of the interior and exterior regions can be calculated. In a variety of embodiments, m2 and m1 can be extracted using global average pooling operations for the interior and exterior regions. Processes in accordance with many embodiments of the invention can pad the image appropriately so as not to lose any information on the edges. In addition to initial convolutional layers to calculate the gradient in each direction, processes in accordance with many embodiments of the invention can model every iteration of the implicit propagation in an efficient, differentiable manner by applying convolutional layers along with standard trivial operations (e.g., summation and subtraction over all pixels).

Active contour models in accordance with a variety of embodiments of the invention can be evolved according to (9) in a differentiable manner in various software packages. In some embodiments, the first term can be computed according to the surface curvature expression:

$$div\left(\frac{\nabla \phi}{|\nabla \phi|}\right) = \frac{\phi_{xx}\phi_y^2 - 2\phi_{xy}\phi_x\phi_y + \phi_{yy}\phi_x^2}{(\phi_x^2 + \phi_y^2)^{3/2}} \quad (11)$$

where the subscripts denote the spatial partial derivatives of $\phi$, which can be approximated using central finite differences. For the second term, convolutional operations can be leveraged to efficiently compute $m_1(x, y)$ and $m_2(x, y)$ in (8) within image regions interior and exterior to C. Finally, $\partial \phi / \partial t$ in (9) can be evaluated and $\phi(x, y)$ updated according to $$\phi^t = \phi^{t-1} + \Delta t \frac{\partial \phi^{t-1}}{\partial t}, \quad (12)$$

where $\Delta t$ is the size of the time step.

CNN Backbone

CNN backbones in accordance with certain embodiments of the invention can be used to generate initialization maps and/or parameter maps. Although many of the examples described herein describe convolutional neural networks, one skilled in the art will recognize that frameworks in accordance with many embodiments of the invention can accommodate other encoder-decoder models for segmentation, including (but not limited to) Boltzmann machines, autoencoders, and/or recurrent neural networks (RNNs), without departing from this invention. However, CNNs have strong feature extraction capabilities that can guide the ACM component of frameworks in accordance with some embodiments of the invention to avoid suboptimal solutions.

Figure 5:
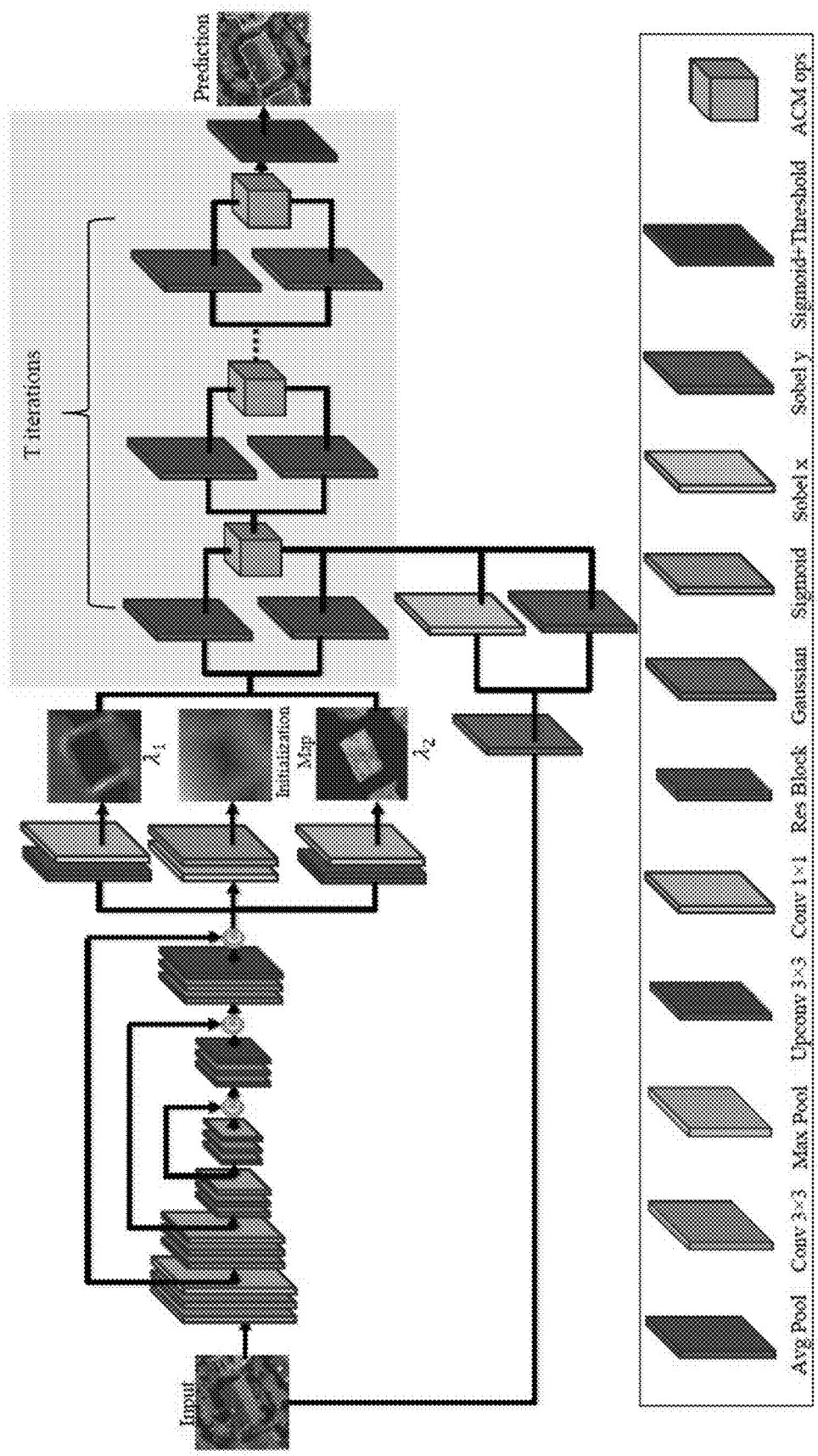
FIG. 5 illustrates an example architecture of a CNN backbone in accordance with an embodiment of the invention.

An example architecture of a CNN backbone in accordance with an embodiment of the invention is illustrated in FIG. 5. CNN backbones in accordance with certain embodiments of the invention can include a fully convolutional encoder-decoder architecture with dilated residual blocks. In this example, each convolutional layer (Conv) is followed by a Rectified Linear Unit (ReLU) as the activation layer and a batch normalization. Dilated residual blocks of this example include two consecutive dilated convolutional layers whose outputs are fused with their inputs and fed into the ReLU activation layer.

In the encoder of this example, each path consists of two consecutive 3×3 convolutional layers, followed by a dilated residual unit with a dilation rate of 2. In various embodiments, before being fed into a dilated residual unit, outputs of these convolutional layers can be added with the output feature maps of another two consecutive 3×3 convolutional layers that learn additional multi-scale information from the resized input image in that resolution.

To recover the content lost in the learned feature maps during the encoding process, processes in accordance with many embodiments of the invention can utilize a series of consecutive dilated residual blocks with different dilation rates (e.g., 1, 2, and 4) and feed the outputs to dilated spatial pyramid pooling layers with different dilation rates (e.g., 1, 6, 12 and 18). In a number of embodiments, decoders can be connected to the dilated residual units at one or more resolutions via skip connections. In some embodiments, in each path, images can be up-sampled and consecutive 3×3 convolutional layers can be employed before proceeding to the next resolution. Outputs of a decoder in accordance with a variety of embodiments of the invention can be fed into another series of consecutive convolutional layers and then passed into three separate streams. In numerous embodiments, the streams that predict the parameter maps $\lambda_1(x, y)$ and $\lambda_2(x, y)$ include a residual block followed by a 1×1 convolutional layer with an activation layer. The stream that predicts initialization maps $\phi(x, y, 0)$ in accordance with numerous embodiments of the invention can be fed into a 1×1 convolutional layer with an activation layer. In certain embodiments, the activation layer of the different streams can be different. For example, in certain embodiments, the activation layers for the parameter map streams can use a ReLU activation layer while the activation layer for the initialization map stream may use a sigmoid function.

CNN backbones in accordance with a variety of embodiments of the invention can include any of a variety of standard encoder-decoder architectures, that can include (but are not limited to) convolutional layers, residual blocks, and/or skip connections between the encoder and decoder. In this example, each 3×3 convolutional layer is followed by ReLU activation and batch normalization. Each residual block consists of two 3×3 convolutional layers and an additive identity skip connection. The first stage of the encoder of this example comprises two 3×3 convolutional layers and a max pooling operation. Its second and third stages are comprised of a residual block followed by a max pooling operation. Each stage of the decoder performs a bilinear upsampling followed by two convolutional layers. The encoder is connected to the decoder via three residual blocks as well as skip connections at every stage. The output of the decoder is connected to a 1×1 convolution with three output channels for predicting the $\lambda_1(x, y)$ and $\lambda_2(x, y)$ parameter maps as well as the initialization map $\phi_0(x, y)$.

Figure 6:
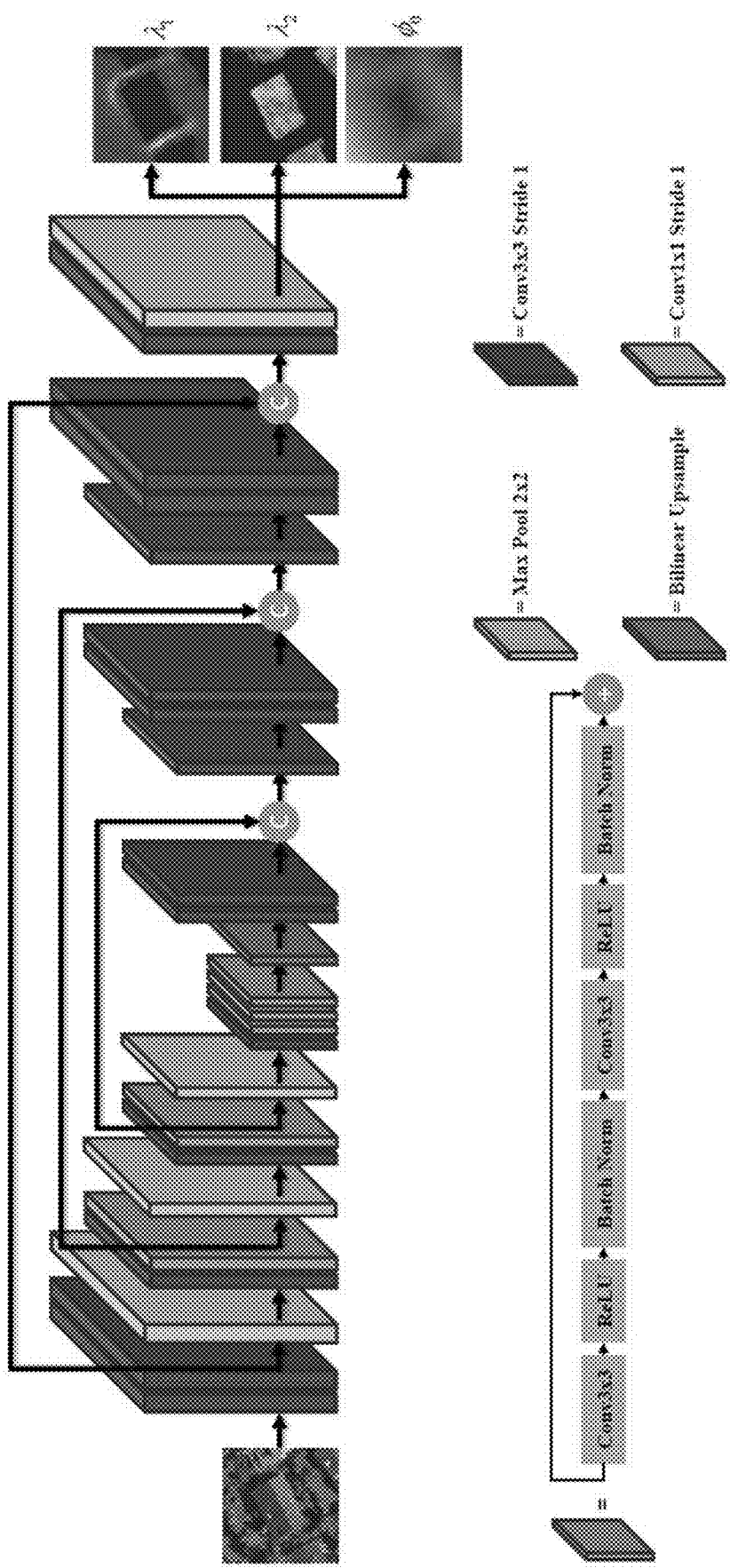

While specific implementations of a CNN have been described above with respect to FIGS. 5 and 6, there are numerous configurations of CNN backbones, including, but not limited to, those using different layer types, layer orders, activation functions, parameters, and/or any other configuration as appropriate to the requirements of a given application.

Architecture and Implementation

In several embodiments, CNN backbones can serve to directly initialize the zero level-set contour. Zero level-sets in accordance with several embodiments of the invention can be initialized by a learned initialization map that is directly predicted by a trained model (e.g., a CNN) along with additional convolutional layers that can learn the parameter maps.

In a variety of embodiments, learned parameters (e.g., parameter maps $\lambda_1$ and $\lambda_2$) can be passed to an ACM that unfolds for a certain number of timesteps in a differentiable manner. The final zero level-set in accordance with various embodiments of the invention can then be converted to logits and compared with a label (e.g., ground truth image segmentation). In numerous embodiments, the resulting error can be back-propagated through the entire framework in order to tune the weights of the CNN backbone.

Figure 7:
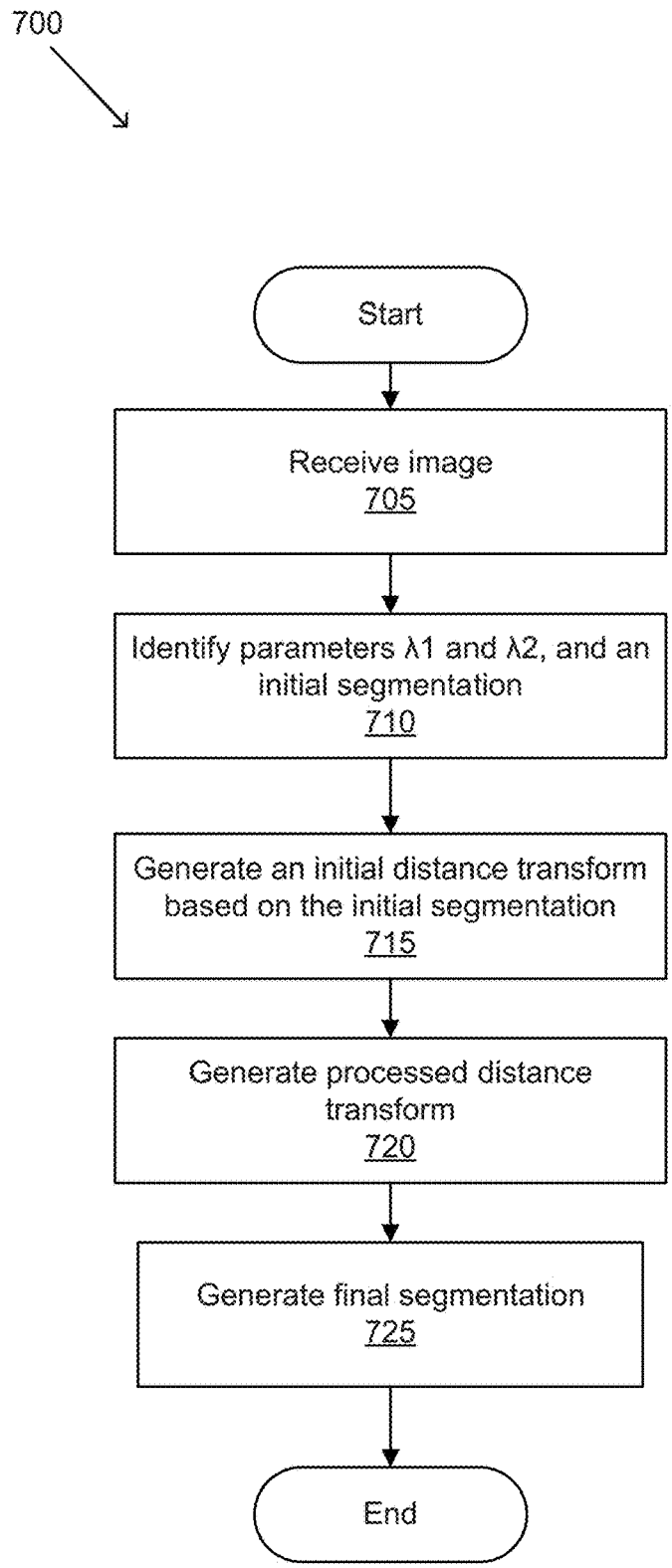
FIG. 7 conceptually illustrates an example of a process for image segmentation in accordance with an embodiment of the invention.

An example of a process for image segmentation in accordance with an embodiment of the invention is illustrated in FIG. 7. Process 700 receives (705) an image to be segmented. Process 700 identifies (710) parameters $\lambda_1$ and $\lambda_2$ and an initial segmentation based on the received image. In various embodiments, parameter maps and/or initial segmentations can be identified using a backbone convolutional neural network (CNN). Processes in accordance with some embodiments of the invention can use a single trainable scalar parameter for each of $\lambda_1$ and $\lambda_2$, which are constant over the entire image. In some embodiments, processes can use parameter maps with local parameter values for each location in an image by adjusting the inward and outward forces on the contour locally, which can result in significantly improved segmentation accuracy and boundary detail.

Process 700 generates (715) an initialization map c based on the initial segmentation. Initialization maps in accordance with various embodiments of the invention can be zero level-set contours. Processes in accordance with many embodiments of the invention can learn to help localize all building instances simultaneously and to initialize the zero level-sets appropriately while avoiding a computationally expensive and non-differentiable distance transform operation. Although many of the examples described herein segmentation for identifying buildings in images, one skilled in the art will recognize that similar systems and methods can be used in a variety of different applications without departing from this invention. In addition, by initializing the zero level-sets in this manner, instead of the common practice of initializing from a circle, processes in accordance with a number of embodiments of the invention can allow the contour to converge significantly faster and avoid undesirable local minima.

Process 700 generates (720) a processed distance map (or a final segmentation) $\phi_N$ using an ACM based on the initialization map $\phi_0$ and the parameter maps $\lambda_1$ and $\lambda_2$. Processes in accordance with a variety of embodiments of the invention can generate the processed distance map by passing the initial transform through an ACM for a series of N (one or more) iterations based on parameter maps.

In various embodiments, in each ACM layer, each point along the zero level-set contour can be probed by a local window and the mean intensity of the inside and outside regions (i.e., $m_2$ and $m_1$) are extracted. In a number of embodiments, $m_1$ and $m_2$ can be extracted by using a differentiable global average pooling layer with appropriate padding not to lose any information on the edges. Global average pooling layers with padding can used to extract the local intensities of pixels while avoiding the loss of information on the boundaries. Padding can allow processes in accordance with some embodiments of the invention to segment instances (e.g., buildings) located on the edges of images.

Process 700 generates (725) a final segmentation by passing the processed initialization map through one or more activation functions. Activation functions in accordance with many embodiments of the invention can include (but are not limited to) the sigmoid function.

While specific processes for generating image segmentations are described above, any of a variety of processes can be utilized to segment images as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

In several embodiments, image segmentation can be performed using a trained segmentation framework. Processes in accordance with a number of embodiments of the invention can simultaneously train a CNN and level-set components in an end-to-end manner with no human intervention. The CNN can guide the ACM by predicting the $\lambda_1(x, y)$ and $\lambda_2(x, y)$ parameter maps, as well as an initialization map $\phi_0(x, y)$ from which $\phi(x, y)$ evolves through the L layers of the ACM in a differentiable manner, thus enabling training error backpropagation. In several embodiments, the $\phi_0(x, y)$ output of the CNN can be passed into a Sigmoid activation function to produce a prediction P. Training in accordance with various embodiments of the invention can optimize a loss function that combines multiple losses, such as (but not limited to) binary cross entropy and Dice losses:

$$\hat{\mathcal{L}}(X) = -\frac{1}{N}\sum_{j=1}^{N}[X_j \log G_j + (1-X_j)\log(1-G_j)] + 1 - \frac{\sum_{j=1}^{N} 2 X_j G_j}{\sum_{j=1}^{N} X_j + \sum_{j=1}^{N} G_j}, \quad (13)$$

where $X_j$ denotes the output prediction and $G_j$ the corresponding ground truth at pixel j, and N is the total number of pixels in the image. The total loss of the model in accordance with many embodiments of the invention is $$\mathcal{L} = \mathcal{L}_{ACM} + \mathcal{L}_{CNN}, \quad (14)$$

where $\mathcal{L}_{ACM} = \hat{\mathcal{L}}(\phi_L)$ is the loss computed for the output $\phi_L$ from the final ACM layer and $\mathcal{L}_{CNN} = \hat{\mathcal{L}}(P)$ is the loss computed over the prediction P of the backbone CNN.

Figure 8:
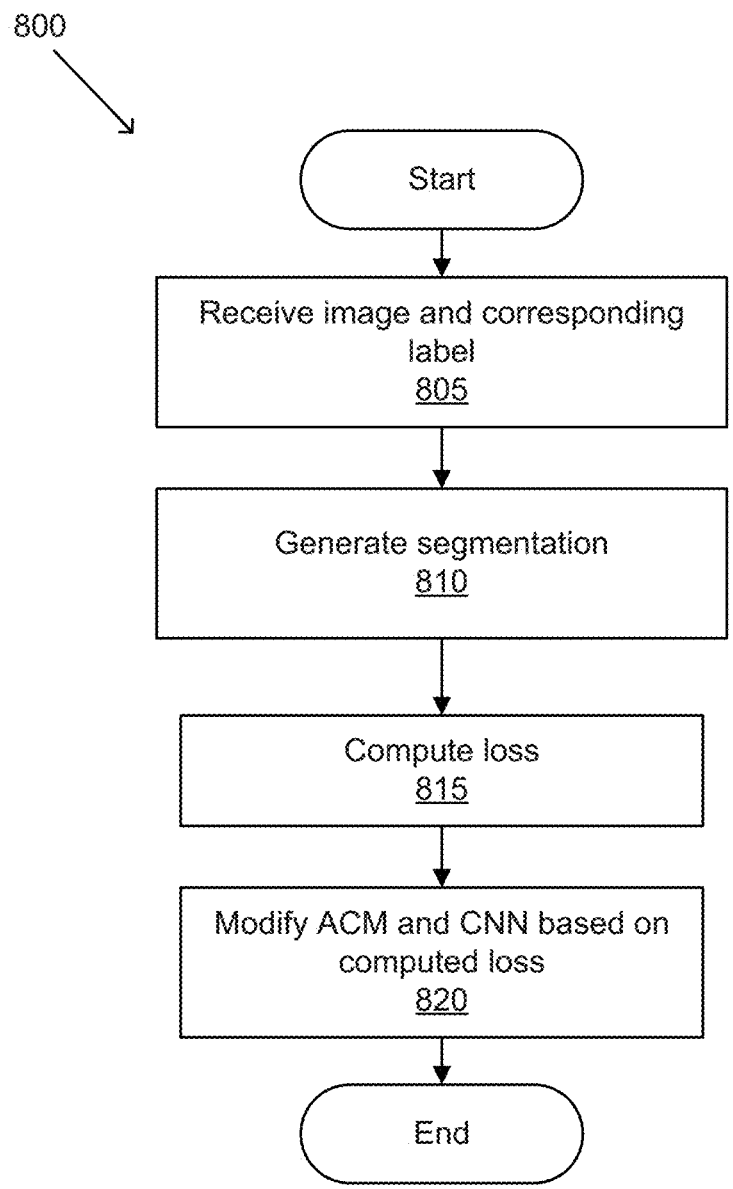
FIG. 8 conceptually illustrates an example of a process for training a segmentation framework in accordance with an embodiment of the invention.

An example of a process for training a segmentation framework in accordance with an embodiment of the invention is illustrated in FIG. 8. Process 800 receives (805) an image X and corresponding label $Y_{gt}$. Process 800 generates (810) a segmentation using a segmentation framework. Generating segmentations in accordance with some embodiments of the invention can be performed using processes similar to those described above with reference to FIG. 7.

Process 800 computes (815) a loss for the generated segmentation based on the ground truth label $Y_{gt}$. Process 800 modifies (820) the ACM and the CNN based on the computed loss. In a number of embodiments, weights of ACMs and/or CNNs can be modified through a backpropagation process.

While specific processes for training an image segmentation framework are described above, any of a variety of processes can be utilized to train image segmentation frameworks as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Systems for Segmentation Mask Generation
Image Segmentation System

Figure 9:
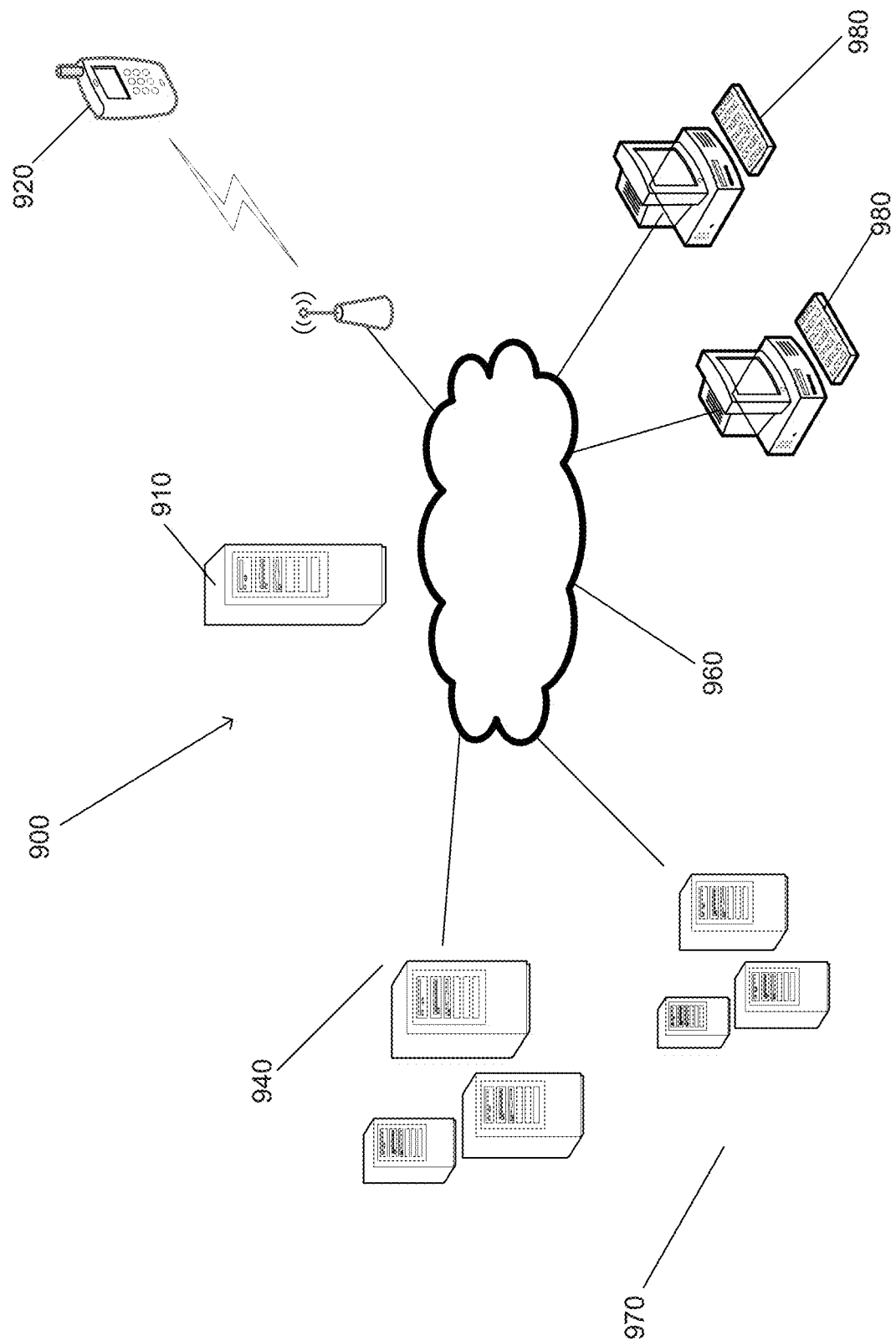
FIG. 9 illustrates an image segmentation system that segments images and train image segmentation models in accordance with some embodiments of the invention.

An image segmentation system that segments images and train image segmentation models in accordance with some embodiments of the invention is shown in FIG. 9. Network 900 includes a communications network 960. The communications network 960 is a network such as the Internet that allows devices connected to the network 960 to communicate with other connected devices. Server systems 910, 940, and 970 are connected to the network 960. Each of the server systems 910, 940, and 970 is a group of one or more servers communicatively connected to one another via internal networks that execute processes that provide cloud services to users over the network 960. For purposes of this discussion, cloud services are one or more applications that are executed by one or more server systems to provide data and/or executable applications to devices over a network. The server systems 910, 940, and 970 are shown each having three servers in the internal network. However, the server systems 910, 940 and 970 may include any number of servers and any additional number of server systems may be connected to the network 960 to provide cloud services. In accordance with various embodiments of this invention, an image segmentation system that uses systems and methods that segment images and/or train image segmentation models in accordance with an embodiment of the invention may be provided by a process being executed on a single server system and/or a group of server systems communicating over network 960.

Users may use personal devices 980 and 920 that connect to the network 960 to perform processes that segment images in accordance with various embodiments of the invention. In the shown embodiment, the personal devices 980 are shown as desktop computers that are connected via a conventional "wired" connection to the network 960. However, the personal device 980 may be a desktop computer, a laptop computer, a smart television, an entertainment gaming console, or any other device that connects to the network 960 via a "wired" connection. The mobile device 920 connects to network 960 using a wireless connection. A wireless connection is a connection that uses Radio Frequency (RF) signals, Infrared signals, or any other form of wireless signaling to connect to the network 960. In FIG. 9, the mobile device 920 is a mobile telephone.

However, mobile device 920 may be a mobile phone, Personal Digital Assistant (PDA), a tablet, a smartphone, or any other type of device that connects to network 960 via wireless connection without departing from this invention.

As can readily be appreciated the specific computing system used to segment images and/or to train image segmentation models is largely dependent upon the requirements of a given application and should not be considered as limited to any specific computing system(s) implementation.

Image Segmentation Element

Figure 10:
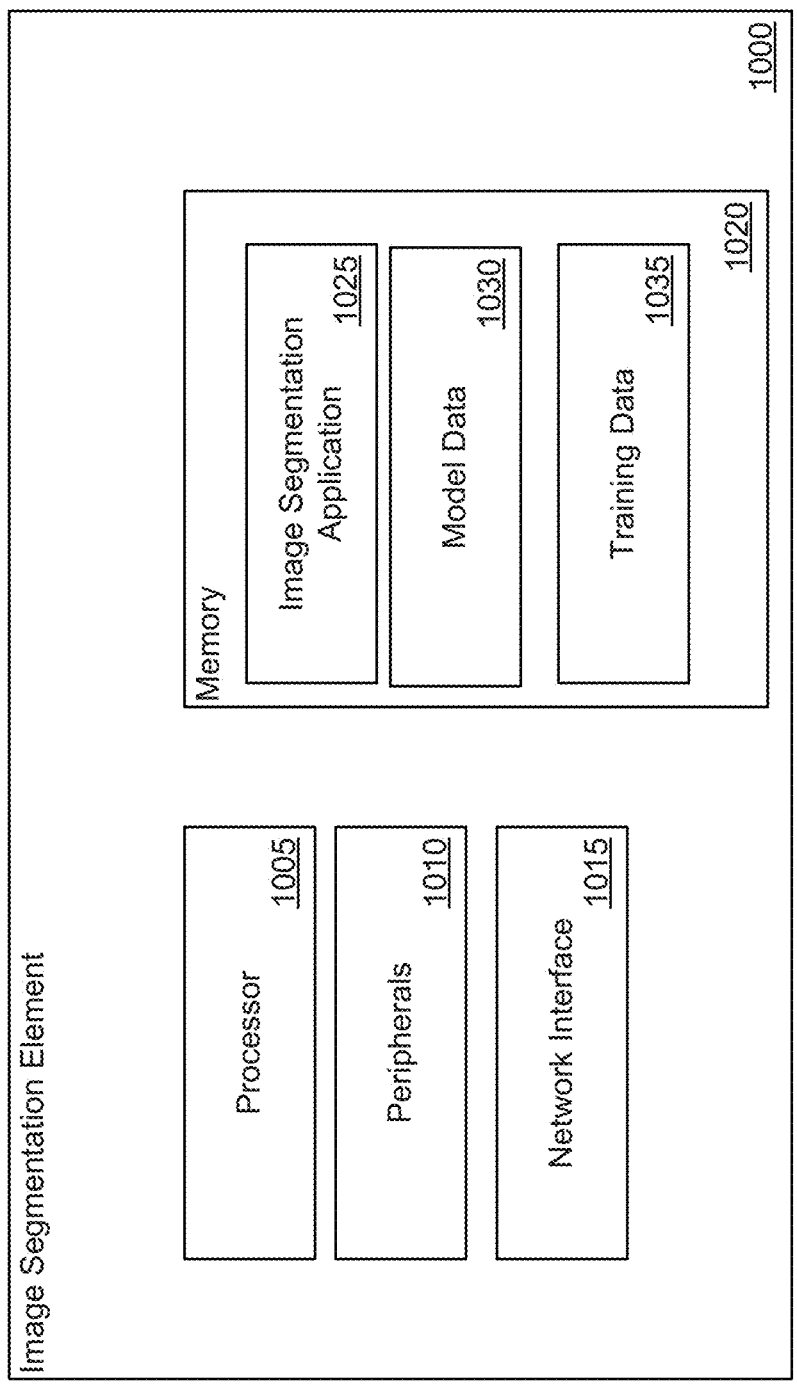
FIG. 10 illustrates an example of an image segmentation element that executes instructions to perform processes that segment images in accordance with various embodiments of the invention.

An example of an image segmentation element that can segment images in accordance with various embodiments of the invention is shown in FIG. 10. Image segmentation elements in accordance with many embodiments of the invention can include (but are not limited to) one or more of mobile devices, cameras, and/or computers. Image segmentation element 1000 includes processor 1005, peripherals 1010, network interface 1015, and memory 1020.

One skilled in the art will recognize that a particular image segmentation element may include other components that are omitted for brevity without departing from this invention. The processor 1005 can include (but is not limited to) a processor, microprocessor, controller, or a combination of processors, microprocessors, and/or controllers that performs instructions stored in the memory 1020 to manipulate data stored in the memory. Processor instructions can configure the processor 1005 to perform processes in accordance with certain embodiments of the invention.

Peripherals 1010 can include any of a variety of components for capturing and displaying data, such as (but not limited to) cameras, displays, and/or sensors. In a variety of embodiments, peripherals can be used to gather inputs and/or provide outputs. Network interface 1015 allows image segmentation element 1000 to transmit and receive data over a network based upon the instructions performed by processor 1005. Peripherals and/or network interfaces in accordance with many embodiments of the invention can be used to gather images to be segmented and/or to transmit segmentations of images.

Memory 1020 includes an image segmentation application 1025, model data 1030, and training data 1035. Image segmentation applications in accordance with several embodiments of the invention can be used to train image segmentation models and/or to segment images. In several embodiments, model data can store various parameters and/or weights for image segmentation models (e.g., CNNs and/or ACMs). Model data in accordance with many embodiments of the invention can be updated through training on multimedia data captured on the image segmentation element or can be trained remotely and updated at the image segmentation element. Training data in accordance with various embodiments of the invention can include labeled image data that identifies segmentations for the images.

Although a specific example of an image segmentation element 1000 is illustrated in FIG. 10, any of a variety of image segmentation elements can be utilized to perform processes for image segmentation similar to those described herein as appropriate to the requirements of specific applications in accordance with embodiments of the invention.

Image Segmentation Application

Figure 11:
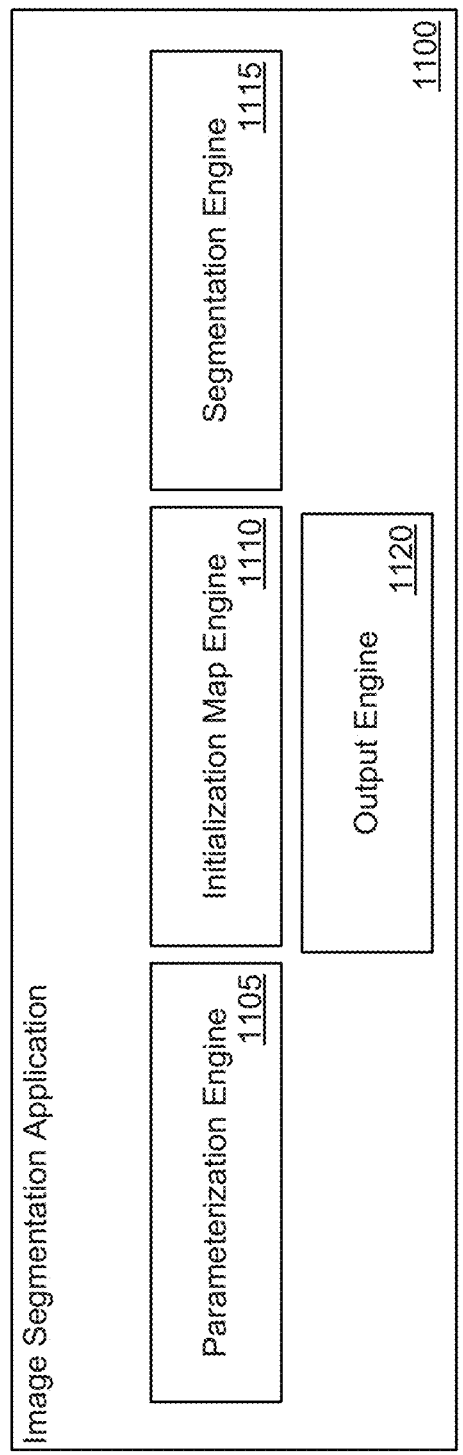
FIG. 11 illustrates an example of an image segmentation application for segmenting images in accordance with an embodiment of the invention.

An image segmentation application for segmenting images in accordance with an embodiment of the invention is illustrated in FIG. 11. Image segmentation application 1100 includes parameterization engine 1105, initialization map engine 1110, segmentation engine 1115, and output engine 1120.

Parameterization engines in accordance with several embodiments of the invention can be used to generate parameters and/or parameter maps, as described throughout this application. In a number of embodiments, initialization map engines can generate an initialization map from an input image. Although initialization map engines and parameterization engines are described separately, the functions of both engines can be performed in accordance with several embodiments of the invention using a single CNN backbone model. Segmentation engines in accordance with many embodiments of the invention can include an ACM to generate segmentations for an image based on generated parameter maps and initialization maps.

Output engines in accordance with several embodiments of the invention can provide a variety of outputs to a user, including (but not limited to) segmented images, evaluations of segmented portions of images, etc.

Although a specific example of an image segmentation application 1100 is illustrated in FIG. 11, any of a variety of image segmentation elements can be utilized to perform processes for segmenting images similar to those described herein as appropriate to the requirements of specific applications in accordance with embodiments of the invention.

Although specific methods of image segmentation are discussed above, many different methods of image segmentation can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for generating image segmentations from an input image, the method comprising:
    receiving an input image;
    providing the input image to a Convolutional Neural Network (CNN) backbone;
    generating, using the CNN backbone, a set of parameter maps $\lambda\_1$ and $\lambda\_2$ from the input image;
    generating, using the CNN backbone, an initialization map from the input image;
    receiving, using an automatically differentiable Active Contour Model (ACM) comprising L layers, the parameter maps $\lambda\_1$ and $\lambda\_2$ and the initialization map;
    generating, using the differentiable ACM, an image segmentation based on the set of parameter maps $\lambda\_1$ and $\lambda\_2$ and the initialization map;
    comparing the image segmentation with a ground-truth label of the input image to compute a set of one or more losses; and
    backpropagating the set of one or more losses to update the differentiable ACM and the CNN backbone.

2. The method of claim 1, wherein the ACM comprises a plurality of neural network layers.

3. The method of claim 1, wherein the set of parameter maps comprises a first parameter map representing inward forces for a contour and a second parameter map representing outward forces for the contour.

4. The method of claim 1, wherein identifying the set of parameter maps further comprises identifying an initial segmentation of the input image and identifying the initialization map is performed using the initial segmentation.

5. The method of claim 4, wherein the initial segmentation is generated using a convolutional neural network.

6. The method of claim 1, wherein the initialization map comprises a set of one or more zero level-set contours.

7. The method of claim 6, wherein the method further comprises, in each ACM layer, probing each point along a zero-level set contour by a local window and extracting a mean intensity of inside and outside regions.

8. The method of claim 1, wherein generating the image segmentation comprises passing the initialization map through a set of one or more activation functions.

9. The method of claim 1, wherein the differentiable ACM utilizes a locally-penalized Eulerian energy functional that is directed predicted by the backbone CNN, wherein the Eulerian energy functional comprises per-pixel parameter maps predicted by the backbone CNN.

10. A non-transitory machine readable medium containing processor instructions for generating image segmentations from an input image, where execution of the instructions by a processor causes the processor to perform a process that comprises:
receiving an input image;
providing the input image to a Convolutional Neural Network (CNN) backbone;
generating, using the CNN backbone, a set of parameter maps $\lambda\_1$ and $\lambda\_2$ from the input image;
generating, using the CNN backbone, an initialization map from the input image;
receiving, using an automatically differentiable Active Contour Model (ACM) comprising L layers, the parameter maps $\lambda\_1$ and $\lambda\_2$ and the initialization map;
generating, using the differentiable ACM, an image segmentation based on the set of parameter maps $\lambda\_1$ and $\lambda\_2$ and the initialization map;
comparing the image segmentation with a ground-truth label of the input image to compute a set of one or more losses; and
backpropagating the set of one or more losses to update the differentiable ACM and the CNN backbone.

11. The non-transitory machine readable medium of claim 10, wherein the ACM comprises a plurality of neural network layers.

12. The non-transitory machine readable medium of claim 10, wherein the set of parameter maps comprises a first parameter map representing inward forces for a contour and a second parameter map representing outward forces for the contour.

13. The non-transitory machine readable medium of claim 10, wherein identifying the set of parameter maps further comprises identifying an initial segmentation of the input image and identifying the initialization map is performed using the initial segmentation.

14. The non-transitory machine readable medium of claim 13, wherein the initial segmentation is generated using a convolutional neural network.

15. The non-transitory machine readable medium of claim 10, wherein the initialization map comprises a set of one or more zero level-set contours.

16. The non-transitory machine readable medium of claim 15, further comprising, in each ACM layer, probing each point along a zero-level set contour by a local window and extracting a mean intensity of inside and outside regions.

17. The non-transitory machine readable medium of claim 10, wherein generating the image segmentation comprises passing the initialization map through a set of one or more activation functions.

18. The non-transitory machine readable medium of claim 10, wherein the differentiable ACM utilizes a locally-penalized Eulerian energy functional that is directed predicted by the backbone CNN, wherein the Eulerian energy functional comprises per-pixel parameter maps predicted by the backbone CNN.

* * * * *